US010760479B2

(12) United States Patent
Bayer et al.

(10) Patent No.: US 10,760,479 B2
(45) Date of Patent: Sep. 1, 2020

(54) TURBOCHARGER SURGE MANAGEMENT CONTROL TECHNIQUES TO ELIMINATE SURGE VALVE

(71) Applicants: Ethan E Bayer, Lake Orion, MI (US); David R Pedro, Windsor (CA); David A Lawrence, Lake Orion, MI (US); Saikiran Chikine, Hackensack, NJ (US)

(72) Inventors: Ethan E Bayer, Lake Orion, MI (US); David R Pedro, Windsor (CA); David A Lawrence, Lake Orion, MI (US); Saikiran Chikine, Hackensack, NJ (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/018,960

(22) Filed: Jun. 26, 2018

(65) Prior Publication Data
US 2019/0390595 A1 Dec. 26, 2019

(51) Int. Cl.
*F02B 37/22* (2006.01)
*F02D 41/00* (2006.01)
*F02M 35/10* (2006.01)
*F02B 37/12* (2006.01)

(52) U.S. Cl.
CPC ........ *F02B 37/225* (2013.01); *F02D 41/0007* (2013.01); *F02M 35/1038* (2013.01); *F02B 2037/125* (2013.01); *F02D 2200/04* (2013.01); *F02D 2200/1002* (2013.01)

(58) Field of Classification Search
CPC ......... F02M 35/1038; F02M 35/10157; F02M 35/10163; F02B 37/225; F02B 37/22; F02B 2037/125; F02D 41/0007; F02D 2200/04; F02D 2200/1002
USPC ............................... 60/600, 601, 611, 605.1
See application file for complete search history.

(56) References Cited

U.S. PATENT DOCUMENTS

| 6,408,624 | B1 | 6/2002 | Books et al. |
| 7,921,944 | B2 | 4/2011 | Russell et al. |
| 8,950,183 | B2 | 2/2015 | Nixon et al. |
| 9,174,637 | B2 * | 11/2015 | Banker .................... B60K 6/48 |
| 10,094,337 | B2 * | 10/2018 | Massard ................ F02D 41/005 |
| 10,138,824 | B2 * | 11/2018 | Ohisa .................... F02P 5/1516 |

(Continued)

*Primary Examiner* — Mark A Laurenzi
*Assistant Examiner* — Mickey H France
(74) *Attorney, Agent, or Firm* — Ralph E. Smith

(57) ABSTRACT

A control system and method for an engine including a turbocharger without a surge valve involve utilizing one or more pressure sensors configured to measure air pressure in an intake system of the engine, the intake system comprising a compressor of the turbocharger and a throttle valve downstream from the compressor, and a controller configured to control the engine to avoid surge at the compressor and eliminate a need for the surge valve by determining a desired position for the throttle valve based on a driver requested engine torque, determining a minimum mass flow through the compressor that avoids surge based on the measured air pressure in the intake system and a predetermined compressor map, and commanding the throttle valve to a target position to maintain at least the minimum compressor mass flow, wherein the target position is greater than the desired position, thereby avoiding surge at the compressor.

14 Claims, 4 Drawing Sheets

(56) References Cited

U.S. PATENT DOCUMENTS

| | | | |
|---|---|---|---|
| 2004/0118117 A1* | 6/2004 | Hartman | F02B 37/18 60/602 |
| 2004/0216457 A1 | 11/2004 | Shea et al. | |
| 2009/0223218 A1 | 9/2009 | Winsor et al. | |
| 2010/0329915 A1* | 12/2010 | Lee | F04C 29/023 418/55.6 |
| 2011/0008197 A1* | 1/2011 | Lee | F04C 29/047 418/55.1 |
| 2013/0073187 A1* | 3/2013 | Koch | F02D 41/0007 701/104 |
| 2014/0047833 A1 | 2/2014 | Buckland et al. | |
| 2015/0300281 A1* | 10/2015 | Sivasubramanian | F02D 41/0027 701/104 |
| 2017/0089276 A1* | 3/2017 | Sunagare | F02D 41/0007 |
| 2017/0145907 A1* | 5/2017 | Nishio | F02D 41/0007 |
| 2017/0248087 A1* | 8/2017 | Reisenberger | F02D 11/105 |
| 2017/0349164 A1* | 12/2017 | Miller | B60K 6/40 |
| 2017/0350331 A1* | 12/2017 | Shost | F02D 13/06 |
| 2018/0023490 A1* | 1/2018 | Beno | F04D 27/02 701/102 |
| 2018/0030939 A1* | 2/2018 | Muramatsu | F02D 9/02 |
| 2018/0038319 A1* | 2/2018 | Hakeem | F02D 41/0025 |
| 2018/0073453 A1* | 3/2018 | Choi | F02D 41/0007 |
| 2018/0171908 A1* | 6/2018 | Ulrey | F02M 26/52 |
| 2019/0218981 A1* | 7/2019 | Styles | F02D 41/005 |
| 2019/0226390 A1* | 7/2019 | McConville | F02B 37/10 |
| 2019/0226391 A1* | 7/2019 | Buckland | F02B 37/10 |

* cited by examiner

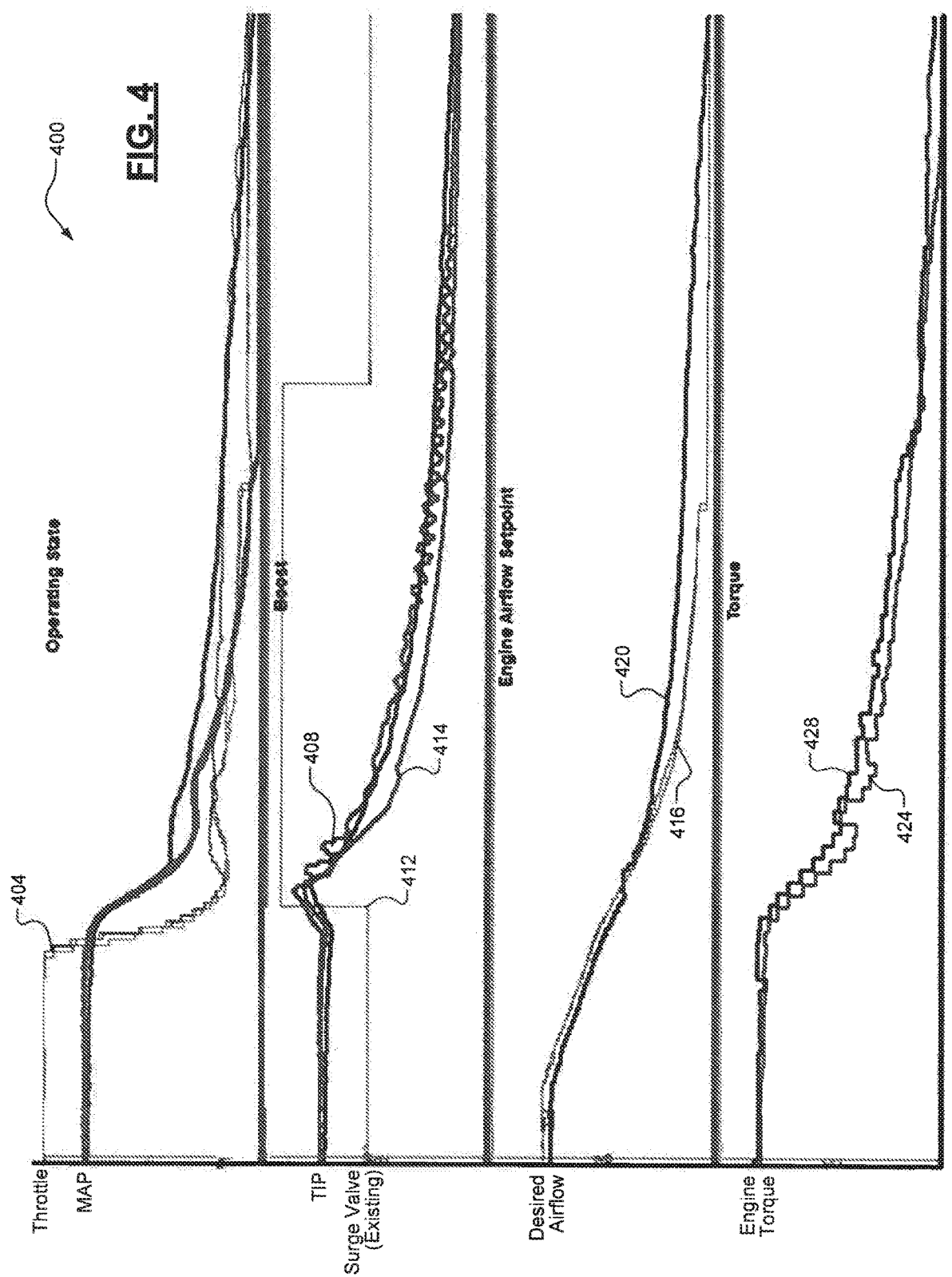

TURBOCHARGER SURGE MANAGEMENT CONTROL TECHNIQUES TO ELIMINATE SURGE VALVE

FIELD

The present application generally relates to turbocharger control systems and, more particularly, to turbocharger surge management control techniques to eliminate a surge valve.

BACKGROUND

Turbocharged engines utilize the kinetic energy of exhaust gas produced by the engine to drive a turbine, which in turn drives a compressor via a rotating shaft. Surge refers to the phenomenon where the air pressure after the compressor is actually higher than the compressor is able to maintain via the kinetic energy it is supplying. This can cause flow reversal through the compressor, pressure build up, and aerodynamic stall. In cases of extreme surge or continuous surge over the life of an engine, the turbocharger (e.g., the turbine) could potentially be damaged. Some operating conditions, such as a quick accelerator pedal tip-out, can induce surge. Surge valves (also known as bypass valves) are typically implemented on turbocharged engines and are configured to open in these events to prevent surge. These surge valves, however, are relatively expensive. Accordingly, while such turbocharger surge control systems work well for their intended purpose, there remains a need for improvement in the relevant art.

SUMMARY

According to one example aspect of the invention, a control system for an engine of a vehicle, the engine including a turbocharger without a surge valve is presented. In one exemplary implementation, the control system comprises: one or more pressure sensors configured to measure air pressure in an intake system of the engine, the intake system comprising a compressor of the turbocharger and a throttle valve downstream from the compressor and a controller configured to control the engine to avoid surge at the compressor and eliminate a need for the surge valve by: determining a desired position for the throttle valve based on a driver requested engine torque, determining a minimum mass flow through the compressor that avoids surge based on the measured air pressure in the intake system and a predetermined compressor map, and commanding the throttle valve to a target position to maintain at least the minimum compressor mass flow, wherein the target position is greater than the desired position, thereby avoiding surge at the compressor.

In some implementations, the controller is further configured to prevent a sail on deceleration of the vehicle by: determining a torque output of the engine at the minimum compressor mass flow, and when this engine torque output is greater than the driver requested engine torque, controlling the engine to further decrease the engine torque output. In some implementations, the controller is configured to command a spark system to retard spark timing to further decrease the engine torque output to achieve the driver requested engine torque. In some implementations, the sail on deceleration is an unexpected deceleration feel for a driver of the vehicle.

In some implementations, the one or more pressure sensors comprise (i) a barometric pressure sensor configured to measure barometric pressure outside of the engine and (ii) a throttle inlet pressure (TIP) sensor configured to measure a TIP indicative of air pressure at an inlet of the throttle valve. In some implementations, the compressor map relates compressor mass flow to a pressure ratio across the compressor. In some implementations, the compressor map defines a surge line corresponding to the minimum compressor mass flow that avoids surge. In some implementations, the controller is further configured to apply an offset to the surge line for determining the minimum compressor mass flow to provide a buffer for further reduction of engine output torque via control of the throttle valve. In some implementations, the engine does not include the surge valve.

According to another example aspect of the invention, a method of controlling an engine of a vehicle to avoid surge at a compressor of a turbocharger of the engine and to eliminate a need for a surge valve is presented. In one exemplary implementation, the method comprises: receiving, by a controller and from one or more pressure sensors, measured air pressure in an intake system of the engine, the intake system comprising the compressor and a throttle valve downstream from the compressor, determining, by the controller, a desired position for the throttle valve based on a driver requested engine torque, determining, by the controller, a minimum mass flow through the compressor that avoids surge based on the measured air pressure in the intake system and a predetermined compressor map, and commanding, by the controller, the throttle valve to a target position to maintain at least the minimum compressor mass flow, wherein the target position is greater than the desired position, thereby avoiding surge at the compressor and eliminating the need for the surge valve.

In some implementations, the method further comprises preventing, by the controller, a sail on deceleration of the vehicle by: determining, by the controller, a torque output of the engine at the minimum compressor mass flow, and when this engine torque output is greater than the driver requested engine torque, controlling, by the controller, the engine to further decrease the engine torque output. In some implementations, the method further comprises commanding, by the controller, a spark system to retard spark timing to further decrease the engine torque output to achieve the driver requested engine torque. In some implementations, the sail on deceleration is an unexpected deceleration feel for a driver of the vehicle.

In some implementations, the one or more pressure sensors comprise (i) a barometric pressure sensor configured to measure barometric pressure outside of the engine and (ii) a TIP sensor configured to measure a TIP indicative of air pressure at an inlet of the throttle valve. In some implementations, the compressor map relates compressor mass flow to a pressure ratio across the compressor. In some implementations, the compressor map defines a surge line corresponding to the minimum compressor mass flow that avoids surge. In some implementations, the method further comprises applying, by the controller, an offset to the surge line for determining the minimum compressor mass flow to provide a buffer for further reduction of engine output torque via control of the throttle valve. In some implementations, the engine does not include the surge valve.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration

BRIEF DESCRIPTION OF THE DRAWINGS

FIG. 4 is a plot illustrating throttle valve and spark retardation control techniques to avoid compressor surge according to the principles of the present disclosure.

DESCRIPTION

Figure 1:
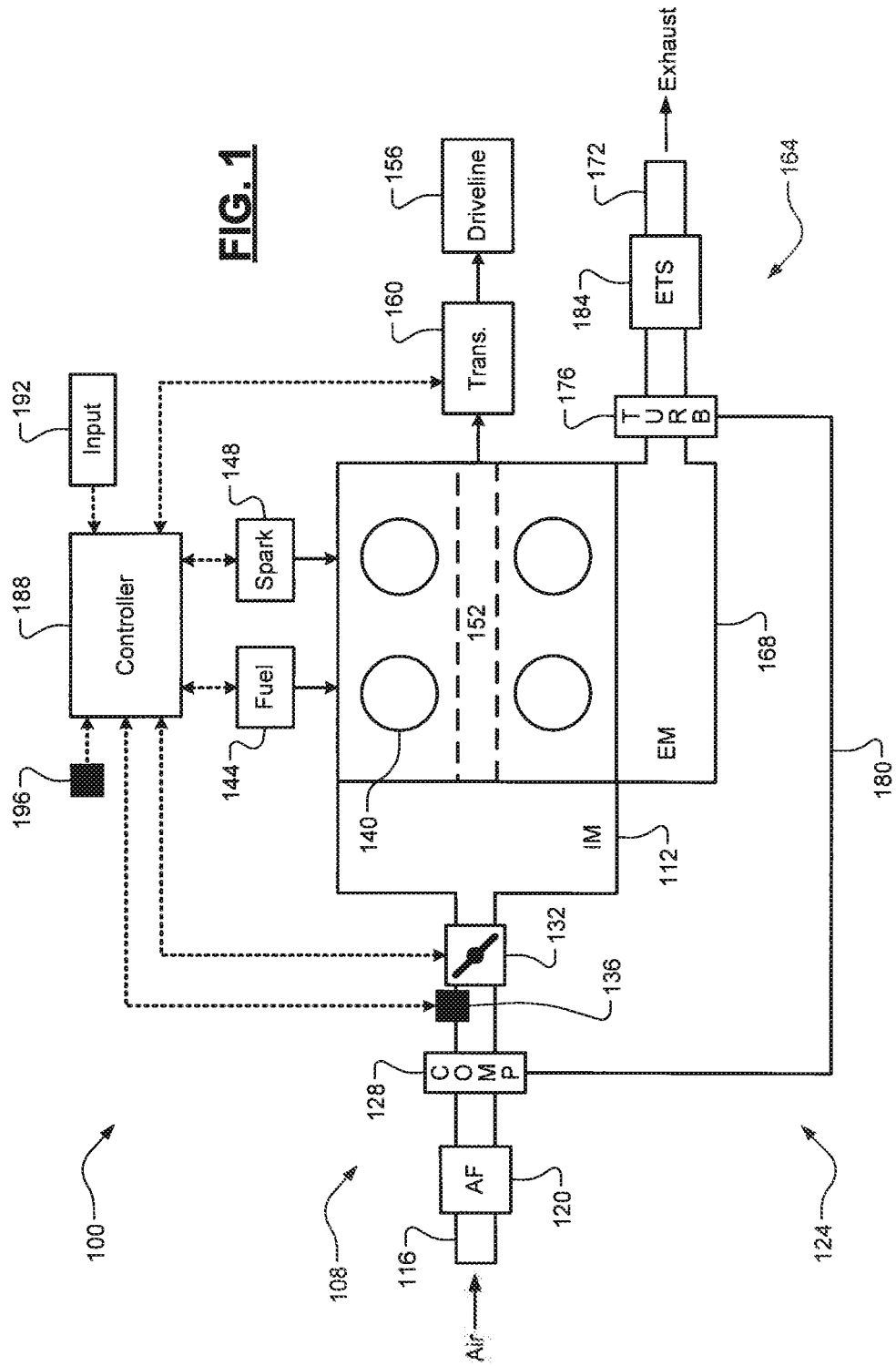
FIG. 1 is a diagram of a vehicle having an example turbocharged engine without a surge valve according to the principles of the present disclosure.

Referring now to FIG. 1, a diagram of a vehicle 100 comprising an example engine 104 according to the principles of the present disclosure is illustrated. The engine 104 draws air through an air intake system 108 into an intake manifold 112. The air intake system 108 comprises an air intake passage 116, an optional air filter (AF) 120, a compressor 128 of a turbocharger 124, and a throttle valve 132. The compressor 128 forces additional air into the engine 104 such that more fuel can be injected to generate more drive torque. A throttle inlet pressure (TIP) sensor 136 in the air intake system 108 measures air pressure at an inlet of the throttle valve 132. Note that the engine 104 does not include a surge valve/system or other similar bypass system for avoiding surge. It will also be appreciated that the engine 104 could include other suitable sensors, such as an intake manifold absolute pressure (MAP) sensor that measures intake manifold pressure. The air in the intake manifold 112 is distributed to a plurality of cylinders 140 and combined with fuel (e.g., gasoline) from a fuel system 144 to form an air/fuel mixture. While four cylinders are shown, it will be appreciated that the engine 104 could include any suitable number of cylinders.

The air/fuel mixture is compressed within the cylinders 140 by pistons (not shown) and the compressed air/fuel mixture is ignited by spark from a spark system 148 to drive the pistons and generate drive torque at a crankshaft 152. The drive torque is transferred from the crankshaft 152 to a driveline 156 of the vehicle 100 via a transmission 160. Exhaust gas resulting from combustion is expelled from the cylinders 140 into an exhaust system 164 beginning with an exhaust manifold 168. The exhaust gas flows through exhaust passage 172 and its kinetic energy drives a turbine 176 of the turbocharger 124, which in turn drives the compressor 128 via a shaft 180. An exhaust treatment system 184 treats the exhaust gas to decrease or eliminate emissions (carbon monoxide, nitrogen oxides, particulate matter, etc.) prior to release into the atmosphere.

A controller 188 controls operation of the engine 104 including, but not limited to, controlling airflow (e.g., via the throttle valve 132), fuel (e.g., via the fuel system 144), spark timing (e.g., via the spark system 148), and gear shifting of the transmission 160. The controller 188 primarily controls the air/fuel/spark of the engine 104 such that the engine 104 generates a desired drive torque based on an engine torque request received via a driver input device 192 (e.g., an accelerator pedal). The controller 188 also receives a measured barometric pressure outside of the vehicle 100 from a barometric pressure sensor 196. While shown as a separate sensor, it will be appreciated that the barometric pressure sensor 196 could be integrated into the controller 188. The controller 188 can utilize the measured barometric pressure and known pressure drops through the air intake system 108 (e.g., across the air filter 120) to determine a pressure ratio across the compressor 128, which is important for controlling the engine 104 to avoid surge according to the principles of the present disclosure.

Figure 2:
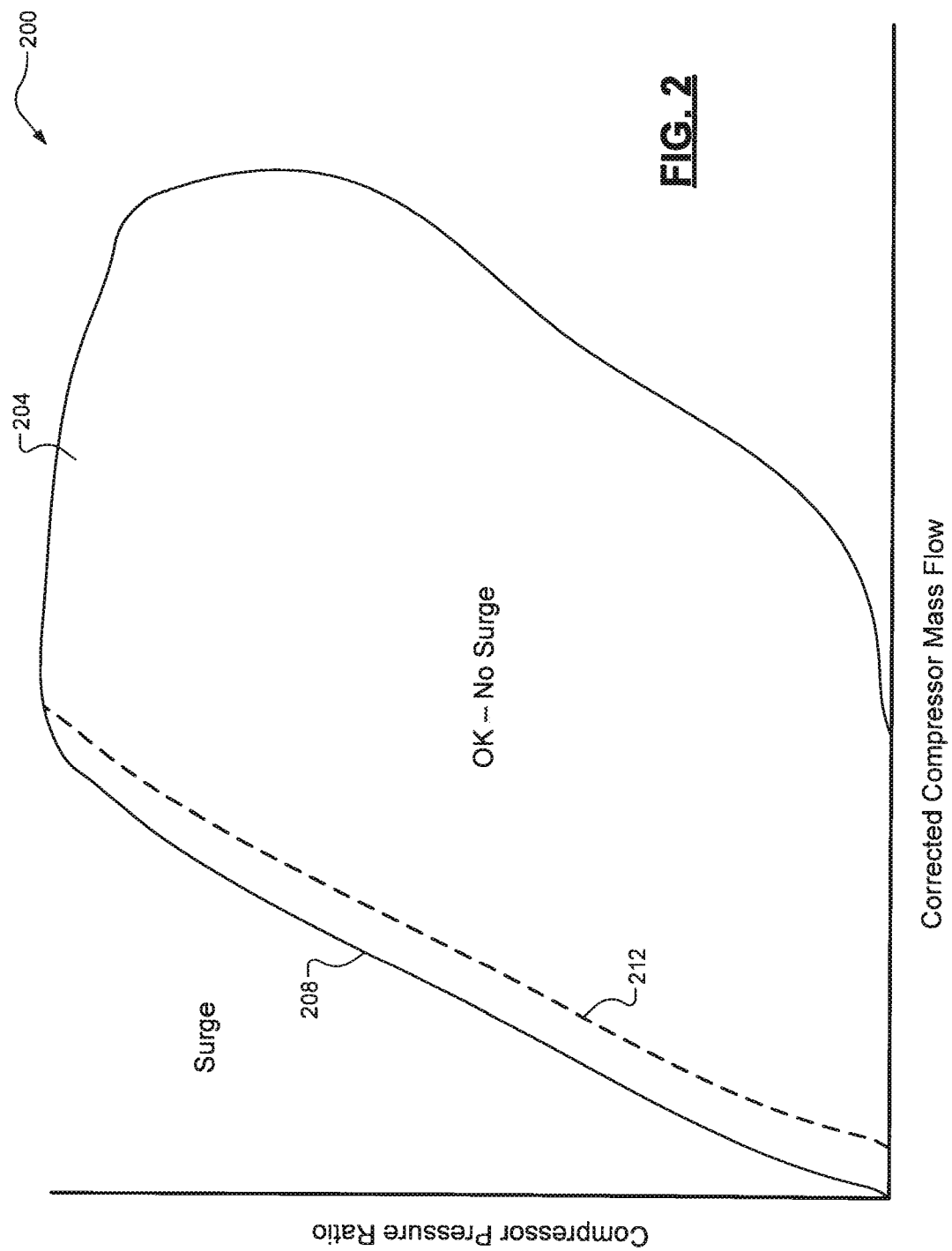
FIG. 2 is a an example compressor map including a surge line according to the principles of the present disclosure.

Referring now to FIG. 2, an example compressor map 200 is illustrated. The compressor map 200 defines desired operating areas for the compressor 128, such as to avoid potential damage to the turbocharger 124. A vertical or y-axis represents the pressure ratio across the compressor 128 (e.g., inlet vs. outlet pressures). A horizontal or x-axis represents the corrected compressor mass flow (e.g., in grams per second, or gls). The compressor map 200, for example, could be provided by a manufacturer or supplier of the turbocharger 124 and the data could be based on testing. Region 204 represents a desired operating range for the compressor 128. It will be appreciated that there could be sub-regions of region 204. In other words, there may be more optimal sub-regions of region 204 than other sub-regions of region 204. The region 204 defines a surge line 208 along its left side. Operating the compressor 128 left of this surge line 208 will result in compressor surge. Offset line 212 defines an offset version of the surge line 208, which provides a buffer such that surge is more likely preventable (rather than operating right along the surge line 208).

Figure 3:
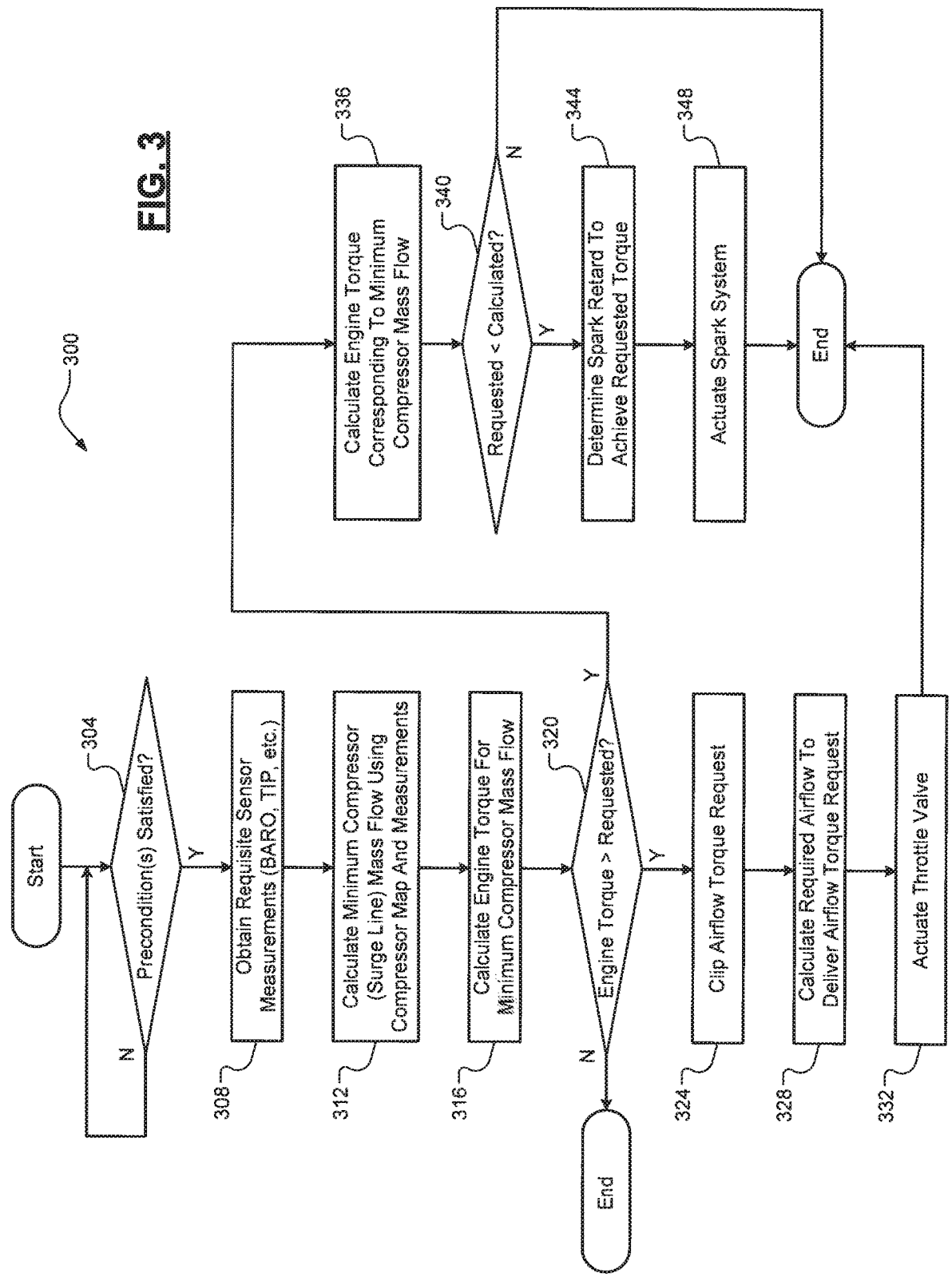
FIG. 3 is a flow diagram of an example method of turbocharger surge management control to eliminate a surge valve according to the principles of the present disclosure.

Referring now to FIG. 3, a flow diagram of a method 300 of turbocharger surge management control to eliminate the need for a surge valve is illustrated. At 304, the controller 188 determines whether a set of one or more optional preconditions are satisfied. This could include, for example only, the engine 104 running. When true, the method 300 proceeds to 308. Otherwise, the method 300 ends or returns to 304. At 308, the controller 188 obtains the requisite measurements from the various sensors of the engine 104. This includes, for example, the measured barometric pressure (BARO) from the barometric pressure sensor 196 and the measured TIP from the TIP sensor 136. It will be appreciated that the controller 188 could also obtain other parameters at this step, such as the driver torque request via driver input device 192. At 312, the controller 188 calculates a minimum compressor mass flow (also referred to as a "surge line mass flow") for the compressor 128 to avoid surge. This calculation is performed, for example, using the compressor map, the measured pressures, and known pressure drops in the air intake system 108.

At 316, the controller 188 calculates engine output torque at this minimum compressor mass flow. At 320, the controller 188 determines whether this calculated engine output torque exceeds the driver requested torque. When false, the method 300 ends or returns to 304. When true, the method 300 splits into parallel control paths at 324 and 336. At 324, the controller 188 clips an airflow torque request or, in other words, maintains the airflow torque request higher than is necessary to meet the driver torque request. At 328, the controller 188 calculates the required airflow to deliver this airflow torque request. At 332, the controller 188 actuates the throttle valve 132 accordingly and this portion of the method 300 ends or returns to 304. At 336, the controller 188 calculates engine output torque corresponding to the minimum compressor mass flow to avoid surge. At 340, the controller 188 determines whether the driver requested torque is less than this calculated engine output torque. When false, the method 300 ends or returns to 304. When true, the method 300 proceeds to 344. At 344, the controller 188 determines an amount of spark retardation to decrease the engine output torque to the driver requested torque. At 348, the controller 188 controls the spark system 148 accordingly and this portion of the method 300 ends or returns to 304.

Referring now to FIG. 4, a plot 400 illustrates operation an engine having a surge valve enabled, an engine having a surge valve disabled, and the engine 104 without a surge valve but with the surge management control techniques of the present disclosure. As shown at 404, surge is likely to occur after events such as a throttle tip-out. Line 408 represents the engine with the surge valve disabled and the fluctuations corresponding to the surge phenomena. Line 412 represents the surge valve position command to open, for an engine with the surge valve enabled, and this subsequently prevents pressure fluctuations as shown by line 414. Line 416 represents the desired airflow for the driver torque request, whereas line 420 represents the clipped airflow as part of the surge management control techniques of the present disclosure. Line 424 similarly represents the driver requested torque, whereas line 428 illustrates the engine torque output due to the clipped airflow. As a result, spark retardation is performed to decrease the engine output torque such that it satisfies the driver requested torque (line 424) and prevents a sail on feeling for the driver (note that the spark retardation is not shown in FIG. 4).

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine of a vehicle, the engine including a turbocharger with an absence of a surge valve, the control system comprising:
 one or more pressure sensors configured to measure air pressure in an intake system of the engine, the intake system comprising a compressor of the turbocharger and a throttle valve downstream from the compressor; and
 a controller configured to, in a torque domain of the engine, control the engine to avoid surge at the compressor and eliminate a need for the surge valve by:
  determining a desired engine airflow based on a driver requested engine torque;
  determining a minimum mass flow through the compressor that avoids surge at the compressor based on the measured air pressure in the intake system and a predetermined compressor map;
  controlling engine airflow to achieve the minimum compressor mass flow thereby avoiding surge at the compressor, while also controlling the engine to ensure that its torque output meets the driver requested engine torque; and
  preventing a sail on deceleration of the vehicle or an unexpected deceleration feel for a driver of the vehicle by:
   determining the engine torque output at the minimum compressor mass flow, and
   when the engine torque output at the minimum compressor mass flow is greater than the driver requested engine torque, controlling the engine to further decrease the engine torque output.

2. The control system of claim 1, wherein the controller is configured to command a spark system to retard spark timing to further decrease the engine torque output to achieve the driver requested engine torque.

3. The control system of claim 1, wherein the one or more pressure sensors comprise (i) a barometric pressure sensor configured to measure barometric pressure outside of the engine and (ii) a throttle inlet pressure (TIP) sensor configured to measure a TIP indicative of air pressure at an inlet of the throttle valve.

4. The control system of claim 1, wherein the compressor map relates compressor mass flow to a pressure ratio across the compressor.

5. The control system of claim 4, wherein the compressor map defines a surge line corresponding to the minimum compressor mass flow that avoids surge.

6. The control system of claim 5, wherein the controller is further configured to apply an offset to the surge line for determining the minimum compressor mass flow to provide a buffer for further reduction of engine output torque via control of the throttle valve.

7. The control system of claim 1, wherein the engine does not include the surge valve.

8. A method of controlling an engine of a vehicle to avoid surge at a compressor of a turbocharger of the engine and to eliminate a need for a surge valve, the method comprising:
 receiving, by a controller and from one or more pressure sensors, measured air pressure in an intake system of the engine, the intake system comprising the compressor and a throttle valve downstream from the compressor; and
 in a torque domain of the engine:
  determining, by the controller, a desired position for the throttle valve engine airflow based on a driver requested engine torque;
  determining, by the controller, a minimum mass flow through the compressor that avoids surge at the compressor based on the measured air pressure in the intake system and a predetermined compressor map;
  controlling, by the controller, engine airflow to achieve the minimum compressor mass flow, thereby avoiding surge at the compressor and eliminating the need for the surge valve, while also controlling the engine to ensure that its torque output meets the driver requested engine torque; and
  preventing, by the controller, a sail on deceleration of the vehicle or an unexpected deceleration feel for a driver of the vehicle by:
   determining the engine torque output at the minimum compressor mass flow, and when the engine torque output at the minimum compressor mass flow is greater than the driver requested engine torque, controlling the engine to further decrease the engine torque output.

9. The method of claim 8, further comprising commanding, by the controller, a spark system to retard spark timing to further decrease the engine torque output to achieve the driver requested engine torque.

10. The method of claim 8, wherein the one or more pressure sensors comprise (i) a barometric pressure sensor configured to measure barometric pressure outside of the engine and (ii) a throttle inlet pressure (TIP) sensor configured to measure a TIP indicative of air pressure at an inlet of the throttle valve.

11. The method of claim 8, wherein the compressor map relates compressor mass flow to a pressure ratio across the compressor.

12. The method of claim 11, wherein the compressor map defines a surge line corresponding to the minimum compressor mass flow that avoids surge.

13. The method of claim 12, further comprising applying, by the controller, an offset to the surge line for determining the minimum compressor mass flow to provide a buffer for further reduction of engine output torque via control of the throttle valve.

14. The method of claim 8, wherein the engine does not include the surge valve.

* * * * *